July 20, 1954    N. WARSHAW    2,684,316
LAMINATED GUMMED TAPE
Filed Oct. 31, 1951

Inventor.
Nathan Warshaw
by his Attorneys,
Darby & Darby

Patented July 20, 1954

2,684,316

UNITED STATES PATENT OFFICE

2,684,316

LAMINATED GUMMED TAPE

Nathan Warshaw, New York, N. Y., assignor to Atlantic Gummed Paper Corporation, Brooklyn, N. Y., a corporation of New York Application October 31, 1951, Serial No. 254,087

7 Claims. (Cl. 154—53.6)

This invention relates to improvements in gummed tape for use as corner hinges for cartons, sealing strips for cartons, and other uses requiring a strong flexible tape.

An object of this invention is to provide a multiple ply gummed tape of novel construction.

Another object of the invention is to provide a multiple ply gummed tape which will not be overstressed when bent along a medial line, indeed an angular tape for reinforcing the corners of cartons.

A more detailed object of the invention is to provide a gummed tape composed of a plurality of plies adhesively bound together on predetermined areas interspersed by disconnected areas.

Other and more detailed objects of the invention will be apparent from the following description of the two embodiments thereof illustrated in the accompanying drawings.

Figure 1:
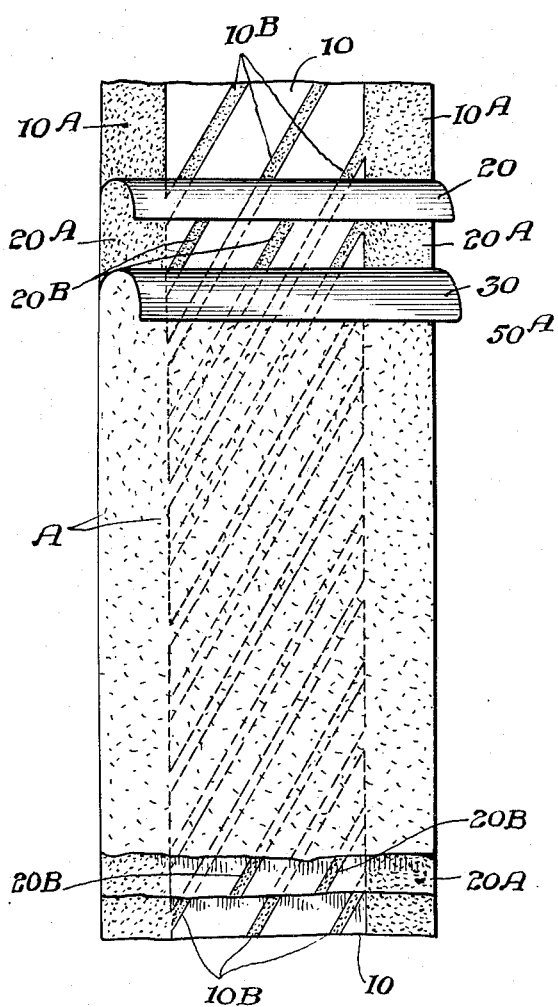
Figure 2:
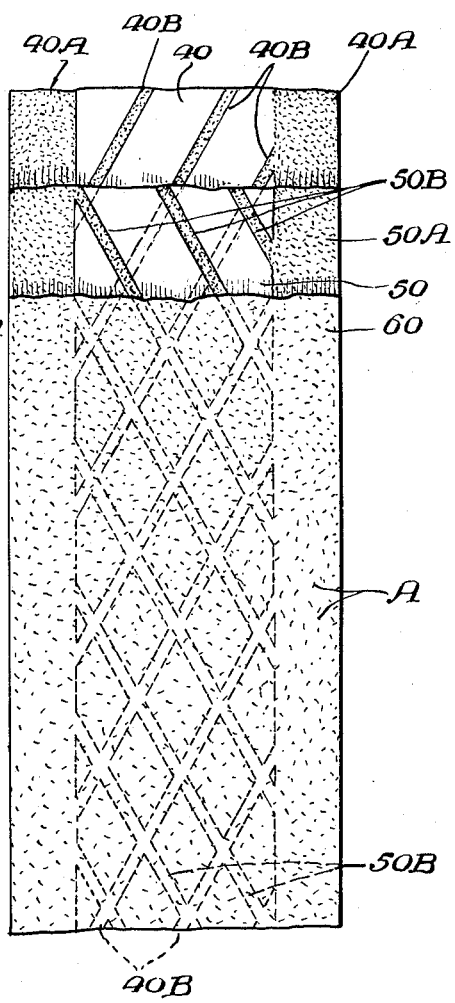

In the accompanying drawings,

Figure 1 is a plan view of one form of tape in accordance with this invention composed of three superposed layers; and Figure 2 is a similar view of a modified structure.

It has heretofore been proposed to provide gummed tapes of the type used for reinforcing and sealing containers among other uses, made up of a plurality of plies of fibrous material such as paper adhesively bound together throughout the areas of their opposed faces. This results in a relatively stiff tape which is hard to handle. Additionally, and as important, is the fact that in sharply bending such tapes along a medial line, as into right angled relationship to form a corner reinforcing, the successively outermost layers are stretched and thereby weakened. It will be apparent that in so bending such tapes, the successive layers outwardly will be more and more stretched along the bend line, to the point where the outermost layer is weakened and tends to break away from the subjoined layer. The main purpose of this invention is to provide a multiple layer gummed tape so constructed that the superposed layers are not joined to each other over substantial areas, so that sufficient material is present to allow for the increasing radius of curvature towards the outermost layer, thereby eliminating the stretching due to such bending. In accordance with this invention, the layers are so connected together as to form an overall unitary body while attaining that function.

As shown in Figure 1, the gummed tape is illustrated as composed of three superposed layers of fibrous material such as paper, plain or crepe, of the same width. As the disclosure proceeds it will be apparent that the layers may be of different widths, as for example of increasing or decreasing width from the innermost to the outermost layer. It will be assumed that the layer 30 is the innermost layer since there is applied all over the exposed surface thereof an adhesive A, which may be a naturally tacky material requiring no treatment to render it adhesive, or may be a glue of the type requiring moistening. The layer 30 overlies an intermediate layer 20 and the two in turn overlie the outermost layer 10. The layers 10 and 20 are adhesively bound together along their marginal edges, preferably by continuous bands of adhesive 10A. In turn the layers 20 and 30 are similarly bound by the adhesive marginal bands 20A. Additionally, the layers 10 and 20 are adhesively bound together between the bands 10A by means of interrupted or spaced bands of adhesive 10B which preferably extend diagonally of the length of the strips, as shown. Likewise, the layers 20 and 30 are additionally adhered together by means of narrow bands 20B of adhesive, also preferably extending diagonally but relatively bonded with respect to the bands 10B so as to lie centrally of the bands 10B. This construction results in a gummed multiple ply tape having areas between each pair of tapes which are disconnected to provide great flexibility and to permit of sufficient collapsing of the strip at right angles to the plane thereof when the strip is bent to provide sufficient material to prevent overstraining of the outermost layers.

A similar construction with some modification is shown in Figure 2. The innermost layer 60 is again provided with an adhesive coating A. It overlies an intermediate strip 50, which in turn overlies the outermost strip 40. Strips 40 and 50 are bonded together along the marginal edges by the bands 40A of adhesive and the strip 60 is bonded to the strip 50 by the bands 50A. The areas between the bonded edges of strips 40 and 50 are bonded together by the adhesive bands 40B which are spaced apart and preferably extend diagonally of the strip. Similarly, the strips 50 and 60 are further bonded together by means of the bands of adhesive 50B, which likewise extend at an angle to the strip, but in the opposite direction to the bands 40B. This tape too, provides a very flexible structure which is exceedingly strong and well adapted to sharp bending without overstressing any of the layers.

Those skilled in the art will appreciate that the details of construction can be varied while attaining the objects of this invention, and I do not, therefore, desire to be strictly limited to the exact details of structure and the arrangement thereof selected for the purposes of illustrating this invention.

What is claimed is:

1. A flexible reinforcing tape for sealing cartons comprising at least three superposed layers of thin fibrous material adhesively bound together along the opposite side edges and adhesively bound together in pairs along narrow lines said lines of adhesive joining the edge areas carrying adhesive and further leaving without adhesive central areas substantially larger than covered by said lines of adhesive.

2. In the combination of claim 1, said narrow lines of bonding extending diagonally of the tape.

3. In the combination of claim 1, said lines of bonding comprising two unaligned sets.

4. In the combination of claim 1, said lines of bonding comprising two unaligned sets extending diagonally of the tape.

5. In the combination of claim 1, said lines of bonding comprising two unaligned sets extending diagonally in opposite directions respectively.

6. A flexible multiple ply reinforcing tape comprising at least three superposed layers of thin fibrous material bonded together in pairs along the marginal edges and along separated areas between the bonded edges said areas of bonding joining the adhesively bonded edges and leaving therebetween unbonded areas substantially larger than the bonded areas.

7. A multiple ply adhesive reinforcing tape in accordance with claim 6, in which the areas of one pair of layers are staggered with respect to the areas of the other pair.

References Cited in the file of this patent

UNITED STATES PATENTS

| Number | Name | Date |
|---|---|---|
| 1,445,070 | Clune | Feb. 13, 1923 |
| 1,683,707 | Smith | Sept. 11, 1928 |
| 2,083,596 | Donley | June 15, 1937 |
| 2,294,347 | Bauer | Aug. 25, 1942 |

FOREIGN PATENTS

| Number | Country | Date |
|---|---|---|
| 311,005 | Germany | Feb. 19, 1919 |